US012794573B2

(12) United States Patent
Moses et al.

(10) Patent No.: US 12,794,573 B2
(45) Date of Patent: Nov. 10, 2026

(54) DECIMATION FACTOR BASED ON TRANSMIT ANTENNA CORRELATION

(71) Applicant: QUALCOMM Incorporated, San Diego, CA (US)

(72) Inventors: Amit Moses, Tel Aviv (IL); Ronen Shaked, Kfar Saba (IL); Amit Bar-Or Tillinger, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 19/064,327

(22) Filed: Feb. 26, 2025

(65) Prior Publication Data

US 2026/0254542 A1 Aug. 27, 2026

(51) Int. Cl.
*H04B 17/21* (2015.01)
*H04B 7/06* (2006.01)
*H04L 25/02* (2006.01)

(52) U.S. Cl.
CPC ............... *H04B 17/21* (2015.01); *H04B 7/06* (2013.01); *H04L 25/0256* (2013.01)

(58) Field of Classification Search
CPC ........ H04B 17/21; H04B 7/06; H04L 25/0256
See application file for complete search history.

(56) References Cited

U.S. PATENT DOCUMENTS 8,605,804 B2 * 12/2013 Carbonelli .......... H04L 25/0232 375/267
10,327,213 B1 * 6/2019 Han .................. H04W 52/0206
2005/0007278 A1 * 1/2005 Anson ........................ G01S 3/48 342/451
2007/0110200 A1 5/2007 Mergen et al.
2009/0052517 A1 * 2/2009 Chen ................... H04L 27/2003 375/235

FOREIGN PATENT DOCUMENTS

CN 102882816 A * 1/2013
WO 2020030848 A1 2/2020

OTHER PUBLICATIONS

International Search Report and Written Opinion issued in PCT/US2026/013320, mailed Jun. 29, 2026, ISA/EPO, 19 pages.

* cited by examiner

*Primary Examiner* — Freshteh N Aghdam
(74) *Attorney, Agent, or Firm* — Dinsmore & Shohl LLP

(57) ABSTRACT

Certain aspects of the present disclosure provide techniques for wireless communications. An example method includes receiving, from a network entity, transmit antenna correlation information associated with the network entity; performing an equalization operation based at least in part on one or more decimation factors, the one or more decimation factors being associated with the transmit antenna correlation information; and communicating with the network entity in accordance with the equalization operation.

30 Claims, 9 Drawing Sheets

DECIMATION FACTOR BASED ON TRANSMIT ANTENNA CORRELATION

INTRODUCTION

Field of the Disclosure

Aspects of the present disclosure relate to wireless communications, and more particularly, to techniques associated with a decimation factor that is based on transmit antenna correlation.

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

Certain aspects provide a method of wireless communications by a user equipment (UE). The method includes receiving, from a network entity, transmit antenna correlation information associated with the network entity; performing an equalization operation based at least in part on one or more decimation factors, the one or more decimation factors being associated with the transmit antenna correlation information; and communicating with the network entity in accordance with the equalization operation.

Certain aspects provide a method of wireless communications by a network entity. The method includes receiving capability information indicating that a UE has a decimation factor capability, the decimation factor capability indicating support for an equalization operation that uses one or more decimation factors; and transmitting, to the UE, transmit antenna correlation information associated with the network entity, the transmit antenna correlation information being associated with the decimation factor capability.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
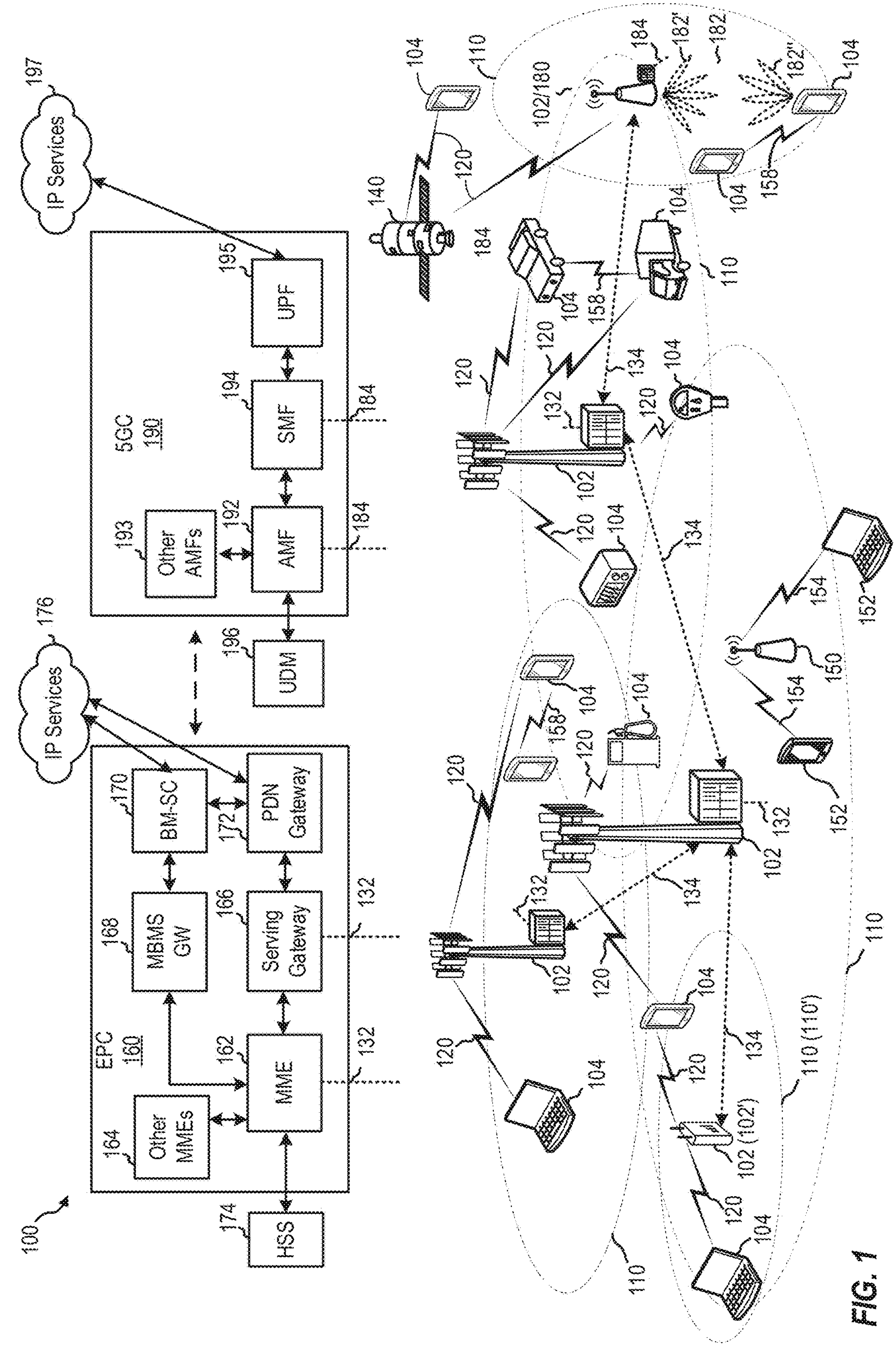
FIG. 1 depicts an example wireless communications network.

Aspects of the present disclosure provide apparatuses, methods, processing systems, and computer-readable mediums associated with a decimation factor this is based on transmit antenna correlation.

Reducing user equipment (UE) power consumption is beneficial with respect to operation of a wireless communications system, particularly as UEs increase in complexity. One example of a power-hungry process at a UE is calculation of equalizer coefficients used for performing equalization. In general, equalization is a signal processing technique that can be used to mitigate effects of distortions in a wireless channel to help recover a transmitted signal (e.g., by compensating for the distortions in the wireless channel). To perform equalization, the UE may calculate equalizer coefficients. One example of an equalization process is minimum mean square error (MMSE) equalization. In association with performing MMSE equalization, a UE typically computes an equalizer coefficient for every frequency-domain/time-domain (FD/TD) resource (e.g., every resource element) in a given slot. The UE then applies each equalizer coefficient in association with performing equalization for each FD/TD resource.

Technical problems for performing equalization in this manner—in which the UE calculates an equalizer coefficient for every FD/TD resource—may include, for example, undesirably high UE power consumption and complexity at the UE. For example, calculating an equalizer coefficient for each FD/TD resource means that the UE performs a high number of calculations (e.g., one for every FD/TD resource), which is costly with respect to UE power consumption. Additionally, the calculation of a given equalizer coefficient associated with a given FD/TD resource involves multiple operations (e.g., matrix inversion and matrix multiplication) and, therefore, can be costly in terms of UE power consumption and complexity at the UE. Furthermore, UE capability with respect to a number of supported layers is increasing (e.g., a "next-gen" UE may support up to eight layer communication, rather than up to four layer communication), meaning that a number of receive antennas at UEs is increasing (e.g., a next-gen UE may have eight receive antennas rather than four receive antennas). The number of receive antennas determines dimensions of a channel matrix (H) associated with performing equalization and, therefore, determines the number of equalizer coefficients that need to be calculated by the UE. It follows that, as UE capability with respect to layer support increases, the number of equalizer coefficients that needs to be calculated by the UE increases, meaning that UE power consumption and calculation complexity also increases.

Aspects described herein may overcome the aforementioned technical problem(s), for example, by providing equalization using decimation factors that are based on transmit antenna correlation. In some aspects, a UE receives transmit antenna correlation information associated with a network entity. The transmit antenna correlation information includes information related to correlation between transmit antennas of the network entity. The UE can then perform an equalization operation (e.g., MMSE equalization) based at least in part on one or more decimation factors. Here, the one or more decimation factors are used to apply decimation with respect to the calculation of the equalizer coefficients, meaning that the UE does not calculate an equalizer coefficient for each and every FD/TD resource. The UE can then communicate with the network entity in accordance with the equalization operation that is performed based at least in part on the one or more decimation factors.

Certain techniques for equalization using decimation factors that are based on transmit antenna correlation information described herein may provide various beneficial technical effects and/or advantages. These techniques for equalization using decimation factors may enable improved wireless communications performance, such as reduced UE power consumption and/or reduced complexity at the UE with respect to performing equalization. The reduced UE power consumption and/or the reduced complexity may be attributable to the techniques and apparatuses described herein, for example, due to reducing the number of equalizer coefficients that need to be calculated by the UE in association with performing equalization.

Introduction to Wireless Communications Networks

The techniques and methods described herein may be used for various wireless communications networks. While aspects may be described herein using terminology commonly associated with 3G, 4G, 5G, 6G, and/or other generations of wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 may include terrestrial aspects, such as ground-based network entities (e.g., BSs 102), and non-terrestrial aspects (also referred to herein as non-terrestrial network entities). A non-terrestrial network entity may include satellite 140, which may be an example of an aerial or space-borne platform. In some examples, satellite 140 may include one or more network entities on-board (e.g., one or more BSs) capable of communicating with other network elements (e.g., terrestrial BSs) and UEs. For example, satellite 140 may be implemented according to a regenerative architecture (also referred to as a non-transparent architecture), and a gNB implemented at satellite 140 may implement higher-layer network functions. As another example, satellite 140 may be implemented according to a transparent architecture, and may perform a physical or other lower-layer repeater function for UEs and a network entity (such as a gateway associated with the satellite 140).

In the depicted example, wireless communications network 100 includes BSs 102, UEs 104, and one or more core networks, such as an Evolved Packet Core (EPC) 160 or a 5G Core (5GC) network 190, which interoperate to provide communications services over various communications links, including wired and wireless links. In some aspects, a core network, such as a 6G core, may implement a converged service-based architecture. In a converged service-based architecture, functions traditionally split between a core network (such as 5GC network 190) and a radio access network (RAN) (such as BS 102) may be implemented at a single network entity. For example, a mobility network entity may perform both core network functions and RAN functions related to mobility of UEs 104 attached to the wireless communications network 100. "Network entity"

can refer to a BS 102, a network entity of EPC 160 or 5GC network 190, or a network entity of a converged service-based architecture.

FIG. 1 depicts various example UEs 104. UE 104 may include a cellular phone, a smart phone, a session initiation protocol (SIP) phone, a laptop, a personal digital assistant (PDA), a satellite radio, a Global Positioning System device, a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an Internet of Things (IoT) device, an always on (AON) device, an edge processing device, a data center, or another similar device. A UE 104 may also be referred to as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. A communications link 120 between a BS 102 and a UE 104 may include uplink (UL) (also referred to as reverse link) transmissions from a UE 104 to a BS 102 and/or downlink (DL) (also referred to as forward link) transmissions from a BS 102 to a UE 104. A communications link 120 may use multiple-input and multiple-output (MIMO) antenna technology, including spatial multiplexing, beamforming, and/or transmit diversity in various aspects.

A BS 102 may include a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point (TRP), a radio unit (RU), a distributed unit (DU), or the like. A given BS 102 may provide communications coverage for a coverage area 110, which may sometimes be referred to as a cell, and which may overlap another coverage area 110 (e.g., a small cell provided by a BS 102') may have a coverage area 110' that overlaps the coverage area 110 of a macro cell). A BS 102 may, for example, provide communications coverage for a macro cell (covering a relatively large geographic area), a pico cell (covering a relatively smaller geographic area, such as a sports stadium), a femto cell (covering a relatively smaller geographic area, such as a home), or another type of cell.

The term "cell" may refer to a portion, partition, or segment of wireless communication coverage served by a network entity within a wireless communications network 100. A cell may have geographic characteristics, such as a geographic coverage area, as well as radio frequency characteristics, such as time and/or frequency resources dedicated to the cell. For example, a specific geographic coverage area may be covered by multiple cells employing different frequency resources (e.g., bandwidth parts) and/or different time resources. As another example, a specific geographic coverage area may be covered by a single cell. In some contexts (e.g., a carrier aggregation scenario and/or multi-connectivity scenario), the terms "cell" or "serving cell" may refer to or correspond to a specific carrier frequency (e.g., a component carrier) used for wireless communications, and a "cell group" may refer to or correspond to multiple carriers used for wireless communications. As examples, in a carrier aggregation scenario, a UE may communicate on multiple component carriers corresponding to multiple (serving) cells in the same cell group, and in a multi-connectivity (e.g., dual connectivity) scenario, a UE may communicate on multiple component carriers corresponding to multiple cell groups.

Figure 2:
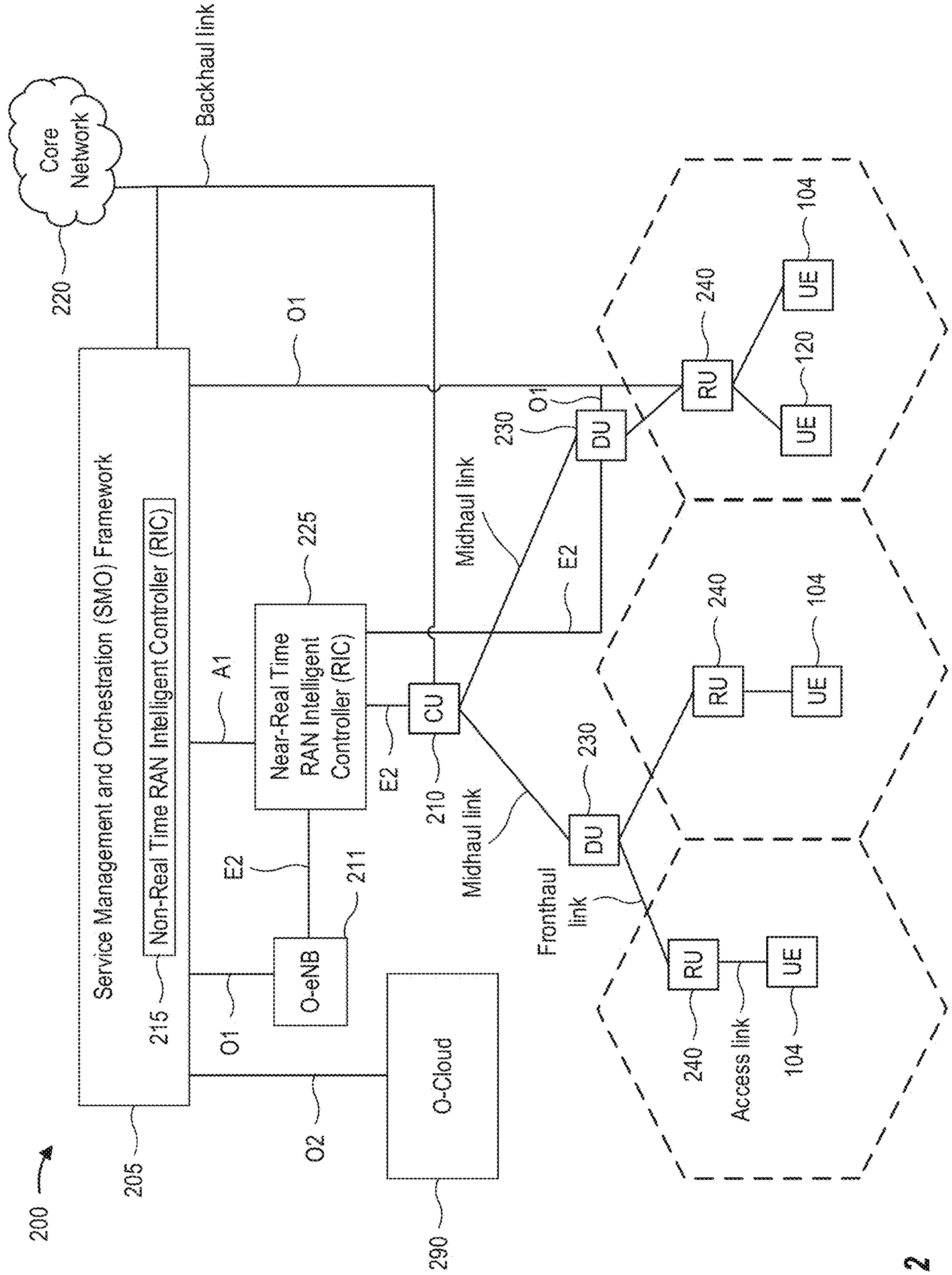
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more DUs, one or more RUs, a Near-Real Time (Near-RT) RAN Intelligent Controller (RIC), or a Non-Real Time (Non-RT) RIC, to name a few examples. In another example, various aspects of a base station may be virtualized. A base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. Implementing a base station in this fashion may provide efficiency gains by enabling cloud-based implementation of certain (e.g., non-time-sensitive) higher-layer functions while physical-layer or other lower-layer functions can be implemented at or in proximity to a geographic coverage area of a corresponding cell. In some aspects, a base station including components that are located at various physical locations may be referred to as having a disaggregated RAN architecture, such as an Open RAN (O-RAN) or Virtualized RAN (VRAN) architecture. FIG. 2 depicts and describes an example disaggregated RAN architecture.

Different BSs 102 within wireless communications network 100 may also be configured to support different radio access technologies, such as 3G, 4G, 5G, and/or 6G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or the 5GC 190) with each other over third backhaul links 134 (e.g., an X2 or XN interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, the Third Generation Partnership Project (3GPP) currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

A communications links 120 may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 180 in FIG. 1) may utilize beamforming (indicated by reference number 182) with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may perform beam training to determine suitable receive and transmit directions for each of BS 180 and UE 104. Notably, the transmit and receive directions for BS 180 may or may not be the same. Similarly, the transmit and receive directions for UE 104 may or may not be the same.

Wireless communications network 100 may include a Wi-Fi access point (AP) 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. In some examples, D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH). D2D communications link 158 may be implemented using a variety of technologies, such as a radio access technology (e.g., 5G, ProSe sidelink), a WiFi technology, a Bluetooth technology, or the like.

EPC 160 may include various functional components, such as a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172. MME 162 may be in communication with a Home Subscriber Server (HSS) 174. MME 162 is a control node that processes signaling between the UEs 104 and the EPC 160. Generally, MME 162 provides bearer and connection management.

Generally, user Internet protocol (IP) packets are transferred through Serving Gateway 166. Serving gateway 166 is connected to PDN Gateway 172. PDN Gateway 172 provides UE IP address allocation as well as other functions. PDN Gateway 172 and BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, such as an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and the 5GC 190. AMF 192 provides, for example, quality of service (QoS) flow and session management.

IP packets are transferred through UPF 195, which is connected to the IP Services 197. UPF 195 may provide UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a core network entity, or a sidelink node, to name a few examples.

FIG. 2 depicts an example disaggregated base station 200 architecture. The disaggregated base station 200 architecture may include one or more CUs 210 that can communicate directly with a core network 220 or other CUs 210 via a backhaul link (such as backhaul link 134), or indirectly with the core network 220 through one or more disaggregated base station units (such as a Near-Real Time (Near-RT) RAN Intelligent Controller (RIC) 225 via an E2 link, a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links (such as communication link 120). In some implementations, a UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or a processor or controller providing instructions to the interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter, or a transceiver (such as a RF transceiver), configured to receive or transmit signals, or both, over a wireless transmission medium.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230 for network control and signaling.

The DU 230 may be or correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more DUs 230 and/or one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
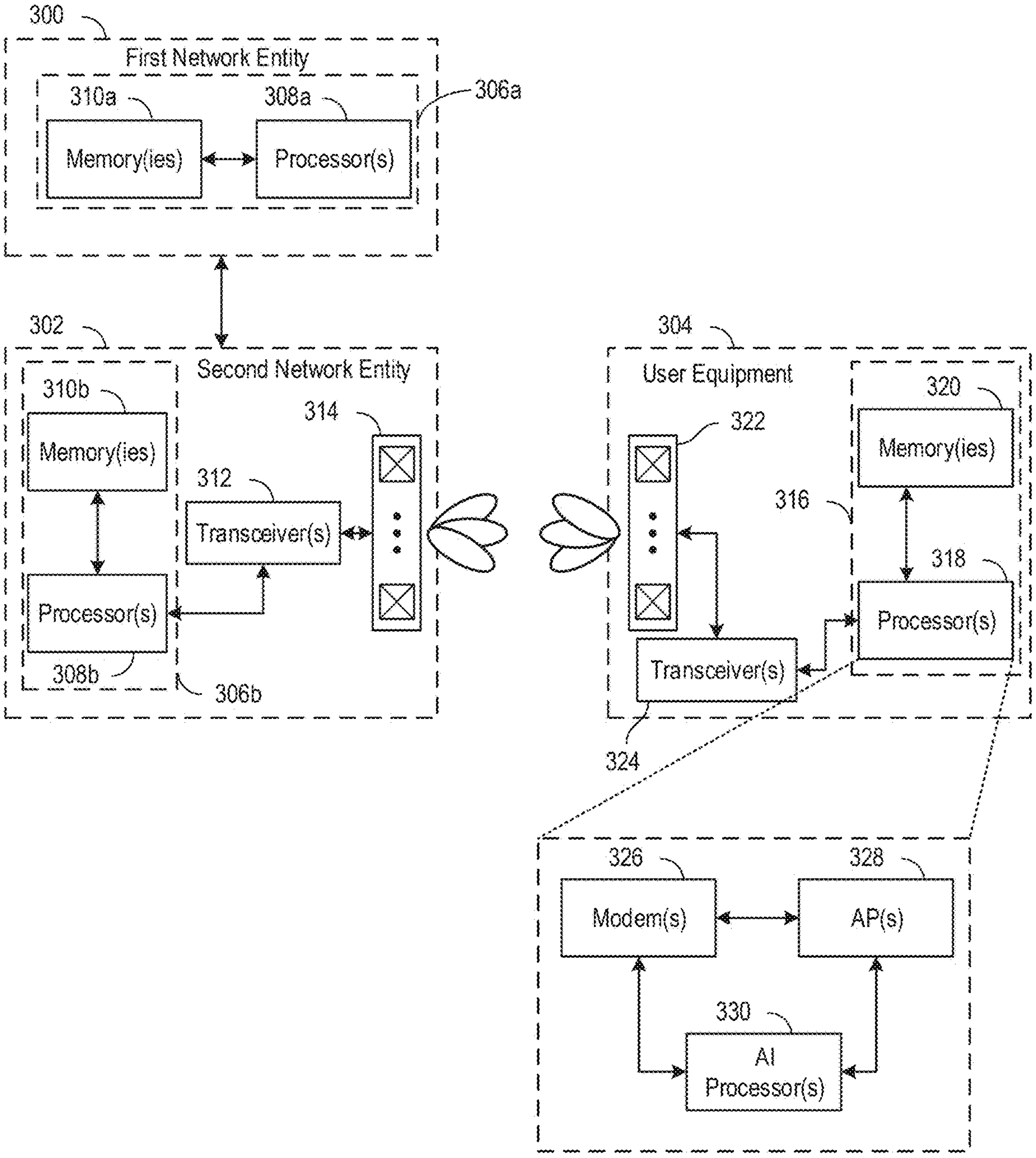
FIG. 3 depicts aspects of network entities and a user equipment (UE).

FIG. 3 depicts aspects of network entities 300 and 302 and a UE 304.

FIG. 3 includes a first network entity 300 and a second network entity 302. In some examples, first network entity 300 may be an example of a CU 210 or a DU 230. In some examples, second network entity 302 may be an example of a DU 230 or an RU 240. First network entity 300 and second network entity 302 may communicate with one another via a communications link, such as a midhaul link. In some examples, first network entity 300 and second network entity 302 may be implemented at a same BS (e.g., BS 102). For example, first network entity 300 and second network entity 302 may be co-located. In some other examples, first network entity 300 may be implemented separately from second network entity 302. For example, first network entity 300 may be implemented as a function (e.g., one or more processes) running on a server, such as in a cloud (e.g., a public or private cloud). As another example, first network entity 300 may be implemented as a virtual computing instance (e.g., virtual machine, container, etc.) or as a physical server.

First network entity 300 and second network entity 302 each include a processing system 306, illustrated as "processing system 306*a*" at first network entity 300 and "processing system 306*b*" at second network entity 302. For example, first network entity 300 and second network entity 302 may include one or more chips, system-on-chips (SoCs), system-in-packages (SiPs), chipsets, packages, or devices that individually or collectively constitute or comprise a processing system 306. A processing system 306 includes one or more processors 308 (illustrated as "processor(s) 308*a*" and "processor(s) 308*b*") and one or more memories 310 (illustrated as "memory(ies) 310*a*" and “memory(ies) 310*b*”) coupled to the one or more processors 308. The one or more processors 308 may include one or multiple processors, microprocessors, processing units (such as central processing units (CPUs), graphics processing units (GPUs), neural processing units (NPUs) (also referred to as neural network processors or deep learning processors (DLPs)) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (any one or more of which may be generally referred to herein individually as a “processor” or collectively as “the processor” or “the processor circuitry”). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

In some aspects, the processing system 306 may perform processing (such as digital signal processing) of data, control information, or signals received or transmitted by a network entity. For example, the processing system 306 may include a coder, a decoder, a multiplexer, a demultiplexer, a transmit MIMO processor, a transmit processor, a receive processor, a receive MIMO detector, an automatic gain control component, or the like.

The one or more memories 310 may include one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as “memories” or collectively as “the memory” or “the memory circuitry”). The one or more memories 310 may store data and program code for first network entity 300 and/or second network entity 302.

As further shown, second network entity 302 includes one or more transceivers 312 (illustrated as “transceiver(s) 312”). The one or more transceivers 312 may perform processing related to implementing physical layer (e.g., radio, air interface) communication with other devices such as UE 304. The one or more transceivers 312 may include one or more radio frequency (RF) components, such as an RF transceiver, a front-end module (e.g., an RF front-end (RFFE)), or the like. For example, the one or more transceivers 312 may include a transmit path (also referred to as a transmit chain), a receive path (also referred to as a receive chain), and/or an interface with one or more antennas 314.

The one or more antennas 314 may perform wireless transmission and reception of signals. The one or more antennas 314 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3.

UE 304 may be an example of UE 104. As shown, UE 304 includes a processing system 316. For example, UE 304 may include one or more chips, SoCs, SiPs, chipsets, packages, or devices that individually or collectively constitute or comprise a processing system 316. A processing system 316 includes one or more processors 318, and one or more memories 320 coupled to the one or more processors 318. Further, UE 304 includes one or more antennas 322, one or more transceivers 324, and/or other components that enable wireless transmission and reception of data.

The one or more processors 318 may include one or multiple processors, microprocessors, processing units (such as CPUs, GPUs, NPUs (also referred to as neural network processors or DLPs) and/or DSPs), processing blocks, ASICs, PLDs (such as FPGAs), or other discrete gate or transistor logic or circuitry (any one or more of which may be generally referred to herein individually as a “processor” or collectively as “the processor” or “the processor circuitry”). One or more of the processors may be individually or collectively configurable or configured to perform various functions or operations described herein. In some aspects, the processing system 316 may perform processing (such as digital signal processing) of data, control information, or signals received or transmitted by a network entity. For example, the processing system 316 may include a coder, a decoder, a multiplexer, a demultiplexer, a transmit MIMO processor, a transmit processor, a receive processor, a receive MIMO detector, an automatic gain control component, or the like.

As shown, in some examples, the one or more processors 318 may include one or more modems 326, one or more application processors (APs) 328, one or more AI processors 330, a combination thereof, and/or another form of processor.

The one or more modems 326 may include a digital signal processor that converts information into a waveform for analog signal transmission (e.g., via modulation) and/or converts the waveform of a received signal into information (e.g., via demodulation). The one or more modems 326 may process information or waveforms in connection with signal transmission or reception. For example, the one or more modems 326 may include a coder, a decoder, a multiplexer, a demultiplexer, a transmit MIMO processor, a transmit processor, a receive processor, a receive MIMO detector, an automatic gain control component, or the like.

The one or more APs 328 may perform processing relating to an operating system and/or a higher layer application of the UE 304. For example, the one or more APs 328 may provide a higher-level operating system (HLOS), software, audio or video processing, graphics processing, or the like. In some examples, the one or more APs 328 may be a data source (e.g., for transmissions) or a data sink (e.g., for receptions).

The one or more transceivers 324 may perform processing related to implementing physical layer (e.g., radio, air interface) communication with other devices such as other UEs 304 or second network entity 302. The one or more transceivers 324 may include one or more RF components, such as an RF transceiver, a front-end module (e.g., an RFFE), or the like. For example, the one or more transceivers 324 may include a transmit path (also referred to as a transmit chain), a receive path (also referred to as a receive chain), and/or an interface with one or more antennas 322.

The one or more antennas 322 may perform wireless transmission and reception of signals. The one or more antennas 322 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3.

For an example downlink transmission by second network entity 302, the processing system 306 (e.g., a transmit processor) may receive data and/or control information. The control information may be for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), and/or others. The data may be for the physical downlink shared channel (PDSCH), in some examples.

The processing system 306 (e.g., a transmit processor) may process (e.g., encode and symbol map) the data and control information to obtain data symbols and control symbols, respectively. The processing system 306 may also generate reference symbols, such as for the primary synchronization signal (PSS), secondary synchronization signal (SSS), PBCH demodulation reference signal (DMRS), or channel state information reference signal (CSI-RS).

The processing system 306 (e.g., a TX MIMO processor) may perform spatial processing (e.g., precoding) on the data symbols, the control symbols, and/or the reference symbols, if applicable, and may provide output symbol streams to one or more modulators of the processing system 306. The one or more modulators may process one or more respective output symbol streams to obtain an output sample stream. The one or more transceivers 312 may process (e.g., convert to analog, amplify, filter, and upconvert) the output sample stream to obtain a downlink signal. Second network entity 302 may transmit the downlink signal via the one or more antennas 314.

In order to receive the downlink transmission at UE 304 (or a sidelink transmission from another UE), the one or more antennas 322 may receive the downlink signal and may provide received signals to the one or more transceivers 324. The one or more transceivers 324 may condition (e.g., filter, amplify, downconvert, and digitize) the received signals to obtain input samples. The one or more transceivers 324 and/or the processing system 316 may further process the input samples to obtain received symbols.

The processing system 316 (e.g., modem 326, an RX MIMO detector) may obtain the received symbols, perform MIMO detection on the received symbols if applicable, and provide detected symbols. The processing system 316 (e.g., a modem 326, a receive processor) may process (e.g., de-interleave and decode) the detected symbols. The processing system 316 may provide decoded data for the UE 304 (e.g., to an AP 328) and/or decoded control information (e.g., to a controller/processor of the processing system 316).

For an example uplink transmission or a sidelink transmission from UE 304, the processing system 316 (e.g., modem 326, a transmit processor) may receive and process data and/or control information to obtain a set of symbols for transmission. The data may be for the physical uplink shared channel (PUSCH), and may be received from a data source such as the AP 328. The control information may be for the physical uplink control channel (PUCCH), and may be received, for example, from a controller/processor of the processing system 316. The processing system 316 (e.g., a modem 326, the transmit processor) may also generate reference symbols for a reference signal (e.g., for a sounding reference signal (SRS), a demodulation reference signal, a phase tracking reference signal, or the like). In some examples, the symbols and/or reference signals may be precoded by the processing system 316 (e.g., modem 326, a TX MIMO processor), further processed by the one or more transceivers 324 (e.g., for SC-FDM), and transmitted to second network entity 302.

At second network entity 302, the uplink signals from UE 304 may be received by the one or more antennas 314, conditioned by the one or more transceivers 312 (e.g., filtered, amplified, downconverted, and digitized), detected (e.g., by the processing system **306*b* such as a modem and/or an RX MIMO detector), and further processed by the processing system 306*b* (e.g., a modem and/or a receive processor) to obtain decoded data and control information sent by UE 304. The processing system 306*b* may provide the decoded data and the decoded control information (such as to a controller/processor of the processing system 306*b*, an AP, first network entity 300**, or another entity).

In various aspects, a wireless communication device, such as first network entity 300, second network entity 302, BS 102, UE 104, or UE 304 may be described as sending, transmitting, obtaining, or receiving various types of data associated with the methods described herein. In these contexts, "transmitting" or "sending" may refer to various mechanisms of outputting data, such as outputting data from a processing system, one or more memories, one or more transceivers, one or more antennas, and/or other aspects described herein. For example, "sending" or "transmitting" by a device may include sending (such as wirelessly, via a wired connection, or both) to a recipient directly or via another device. As another example, "sending" or "transmitting" may include sending internally to a device (such as the UE 304, first network entity 300, or second network entity 302) by a process to memory. "Receiving" or "obtaining" may refer to various mechanisms of obtaining data, such as obtaining data from the processing system, one or more memories, one or more transceivers, one or more antennas, and/or other aspects described herein. For example, "receiving" or "obtaining" by a device may include obtaining (such as wirelessly, via a wired connection, or both) from a recipient directly or via another device. As another example, "receiving" or "obtaining" may include obtaining internally to a device (such as the UE 304, first network entity 300, or second network entity 302) by a process from memory. As used herein, "communicating" by a device may include sending, obtaining, receiving, and/or transmitting a communication. "Communicating" can refer to communication with another device or internal communication of the device.

In various aspects, the processing system 306 or the processing system 316 may include one or more AI processors (such as AI processor 330 of the processing system 316). An AI processor may perform AI processing. The AI processor may include AI accelerator hardware or circuitry such as one or more neural processing units (NPUs), one or more neural network processors, one or more tensor processors, one or more deep learning processors, etc. As an example, the AI processor may perform AI-based beam management, AI-based channel state feedback (CSF), AI-based antenna tuning, and/or AI-based positioning (e.g., non-line of sight positioning prediction). In some cases, at the UE 104, the AI processor may process feedback generated by the UE 304 (e.g., CSF) using hardware accelerated AI inferences and/or AI training. In some cases, at the second network entity 302, the AI processor may decode compressed CSF from the UE 304, for example, using a hardware accelerated AI inference associated with the CSF. In certain cases, the AI processor may perform certain RAN-based functions including, for example, network planning, network performance management, energy-efficient network operations, etc.

FIGS. 4A, 4B, 4C, and 4D depict aspects of data structures for a wireless communications network, such as wireless communications network 100 of FIG. 1.

Figure 4A:
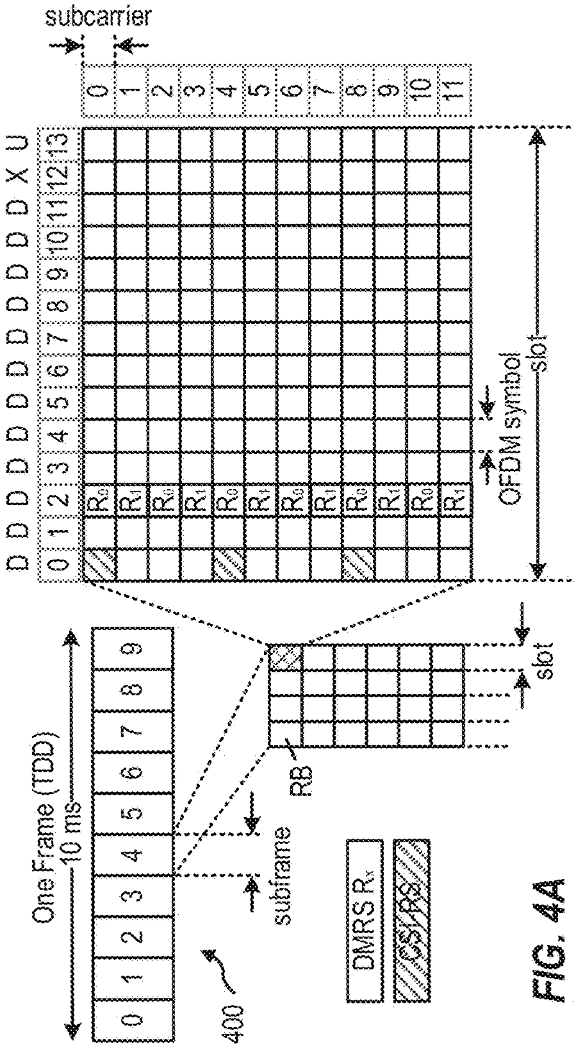
FIGS. 4A, 4B, 4C, and 4D depict various example aspects of data structures for a wireless communications network.
Figure 4B:
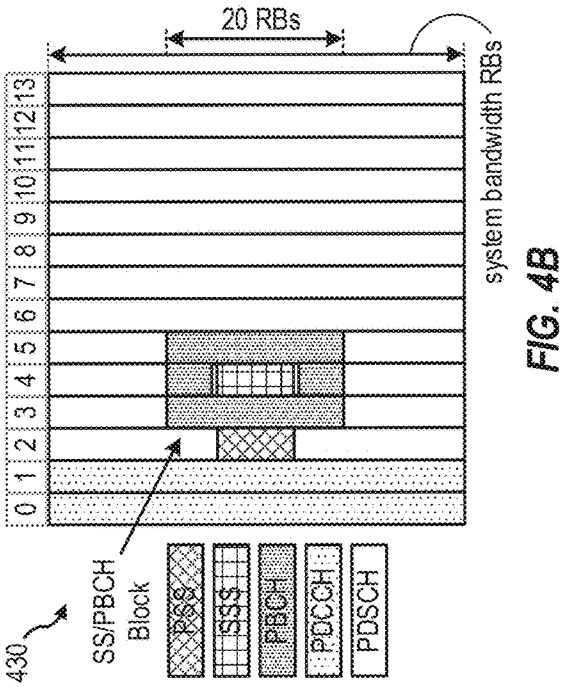
Figure 4C:
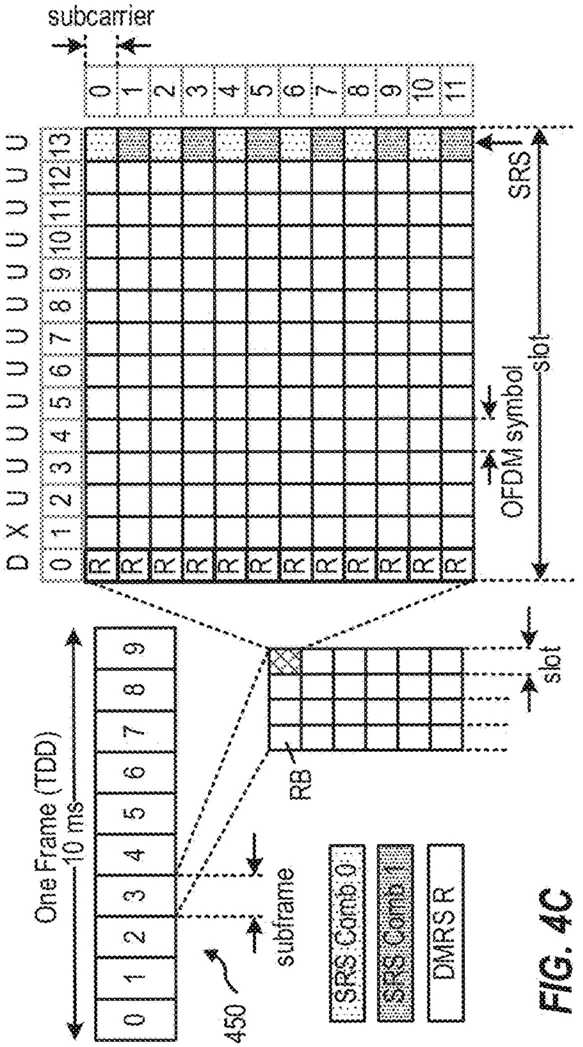
Figure 4D:
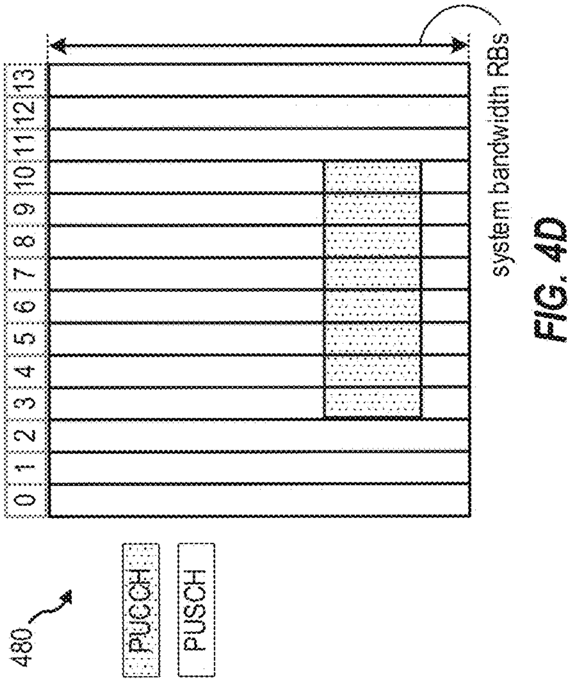

FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. One or more subcarriers may be modulated with data. Modulation symbols may be sent in the frequency domain with OFDM and/or in the time domain with SC-FDM.

In some examples, a wireless communications frame structure may be implemented using frequency division duplexing (FDD). In FDD, some subcarriers may be configured for DL communication, and other subcarriers (which may overlap in time with the DL subcarriers) may be configured for UL communication. In some other examples, wireless communications frame structures may be implemented using time division duplexing (TDD). In TDD, for a particular set of subcarriers, some subframes are configured for DL communication and other subframes are configured for UL communication.

In FIGS. 4A and 4C, the wireless communications frame structure is implemented using TDD. "D" indicates DL time resources, "U" indicates UL time resources, and "X" indicates flexible time resources for use or later reconfiguration for either DL or UL communication. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 12 or 14 symbols, depending on the cyclic prefix (CP) type (e.g., 12 symbols per slot for an extended CP or 14 symbols per slot for a normal CP). Subframes may also include mini-slots, which generally have fewer symbols than an entire slot. Other wireless communications technologies may have a different frame structure and/or different channels.

In certain aspects, the number of slots within a subframe (e.g., a slot duration in a subframe) is based on a numerology. A numerology may define a frequency domain subcarrier spacing and symbol duration, and may be configured for a given bandwidth part, carrier, cell, or network entity. In certain aspects, given a numerology p, there are $2^{\mu}$ slots per subframe. Thus, numerologies (μ) 0 to 6 may allow for 1, 2, 4, 8, 16, 32, and 64 slots, respectively, per subframe. In some cases, an extended CP (e.g., 12 symbols per slot) may be used with a specific numerology, such as numerology p=2 allowing for 4 slots per subframe. The subcarrier spacing and symbol length/duration are a function of the numerology. The subcarrier spacing may be equal to $2^{\mu}\times 15$ kHz. As an example, the numerology p=0 corresponds to a subcarrier spacing of 15 kHz, and the numerology p=6 corresponds to a subcarrier spacing of 960 kHz. The symbol length/duration is inversely related to the subcarrier spacing. FIGS. 4A, 4B, 4C, and 4D provide an example of a slot format having 14 symbols per slot (e.g., a normal CP) and a numerology p=2 with 4 slots per subframe. In such a case, the slot duration is 0.25 ms, the subcarrier spacing is 60 kHz, and the symbol duration is approximately 16.67 s.

As depicted in FIGS. 4A, 4B, 4C, and 4D, a resource grid may be used to represent the frame structure. Each time slot includes a resource block (RB) (also referred to as a physical RB (PRB)) that extends across, for example, 12 consecutive subcarriers. The resource grid is divided into multiple resource elements (REs). An RE may include a single subcarrier in the frequency domain and a single symbol in the time domain. The number of bits carried by each RE depends on the modulation scheme including, for example, quadrature phase shift keying (QPSK) or quadrature amplitude modulation (QAM).

As illustrated in FIG. 4A, some of the REs carry reference (pilot) signals (shown as "RS") for a UE (e.g., UE 104 of FIGS. 1 and 3). The RS may include a demodulation RS (DMRS) and/or a channel state information reference signals (CSI-RS) for channel estimation at the UE. The RS may additionally or alternatively include a beam measurement RS (BRS), a beam refinement RS (BRRS), and/or a phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB), and in some cases, referred to as a synchronization signal block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as "R" for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
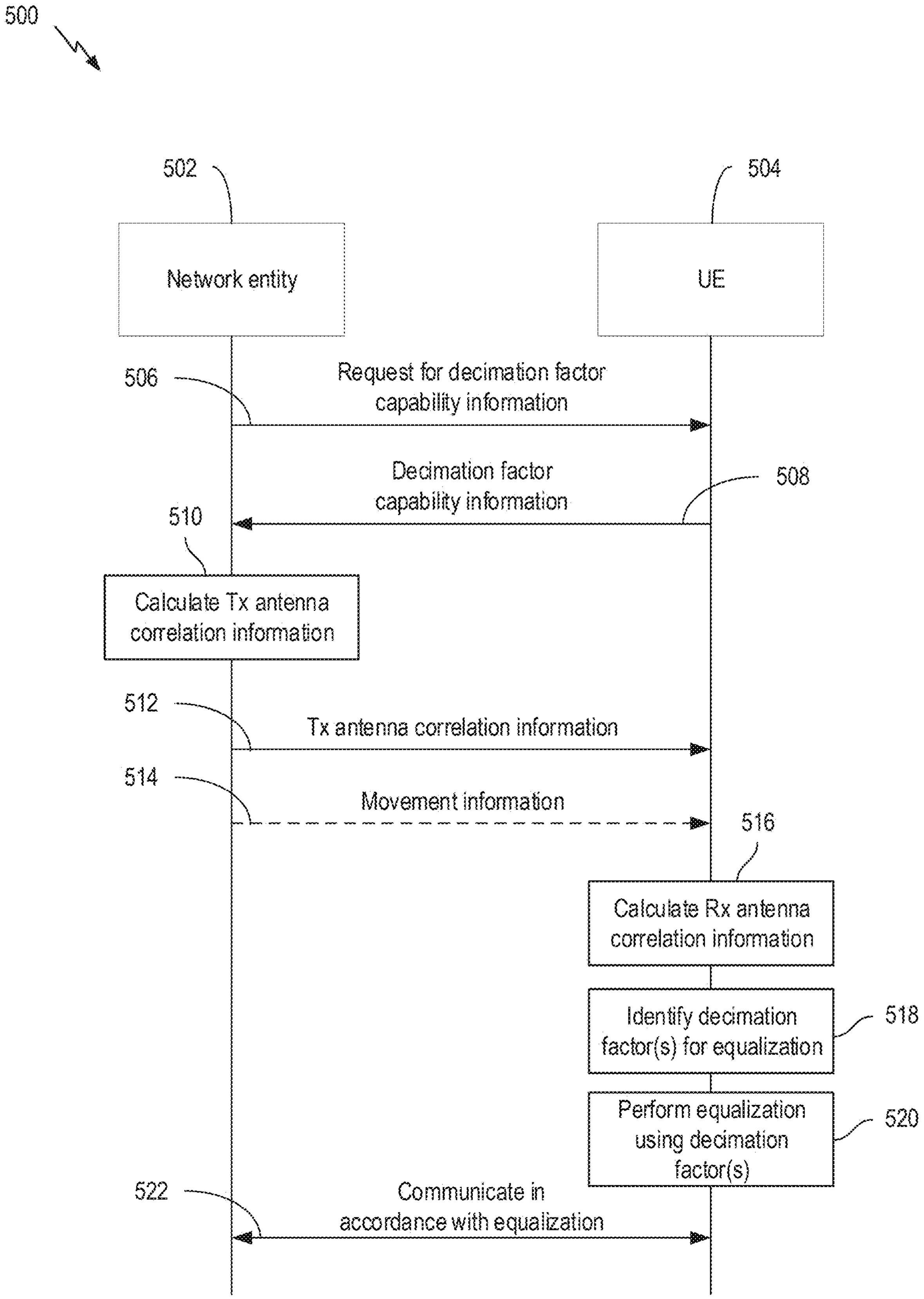
FIG. 5 depicts a process flow for communications in a network between a network entity and a UE.

Example Signaling Associated with Decimation Factors Based on Transmit Antenna Correlation FIG. 5 depicts a process flow 500 for communications in a network between a network entity 502 and a UE 504. In some aspects, the network entity 502 may be an example of the BS 102 depicted and described with respect to FIG. 1, the first network entity 300 or the second network entity 302 depicted and described with respect to FIG. 3, or a disaggregated base station depicted and described with respect to FIG. 2. Similarly, the UE 504 may be an example of UE 104 depicted and described with respect to FIG. 1 or the UE 304 depicted and described with respect to FIG. 3. However, in other aspects, UE 504 may be another type of wireless communications device and network entity 502 may be another type of network entity or network node, such as those described herein. Note that any operations or signaling illustrated with dashed lines may indicate that that operation or signaling is an optional or alternative example.

At 506, the network entity 502 transmits, to the UE 504, a request to provide capability information indicating whether the UE 504 supports equalization operations that use one or more decimation factors. Such a capability is herein referred to as a decimation factor capability. That is, the network entity 502 may transmit, to the UE 504, a request for the UE 504 to provide an indication of whether the UE 504 has a decimation factor capability (e.g., a capability to estimate and use decimation factors in association with perform equalization). In some aspects, the request may be in a medium access control (MAC) control element (MAC CE). In some aspects, the request may be communicated at, for example, a start of communication between the network entity 502 and the UE 504 or upon attachment of the UE 504 to a cell supported by the network entity 502.

At 508, the UE 504 transmits, to the network entity 502, the capability information. For example, the UE 504 may provide the capability information in response to the request. As another example, the UE 504 may automatically (e.g., without a request) provide the capability information based on a triggering event (e.g., a start of communication between the network entity 502 and the UE 504, attachment of the UE 504 to a cell supported by the network entity 502, or the like). In some aspects, if the UE 504 has the decimation factor capability, the capability information provided by the UE 504 indicates that that the UE 504 has the decimation factor capability. Alternatively, if the UE 504 does not have the decimation factor capability, then the capability information indicates that the UE 504 does not have the decimation factor capability. In some aspects, the capability information (e.g., the response to the request) may be in a MAC CE. In some aspects, the capability information may be communicated at, for example, a start of communication between the network entity 502 and the UE 504 or upon attachment of the UE 504 to a cell supported by the network entity 502.

At 510, the network entity 502 may calculate transmit antenna correlation information associated with the network entity 502. Transmit antenna correlation information includes information associated with correlation between transmit antennas of the network entity 502. More particularly, the transmit antenna correlation information includes one or more parameter values that describes a relationship between signals transmitted by different antennas of the network entity 502. In some aspects, the transmit antenna correlation information may quantify a degree to which signals transmitted by different antennas of the network entity 502 are similar to or dependent upon (e.g., correlated with) one another.

In some aspects, the network entity 502 may calculate the transmit antenna correlation information based at least in part on one or more signals. For example, the network entity 502 may receive, from the UE 504, one or more signals (e.g., a sounding reference signal (SRS), a physical uplink shared channel (PUSCH) communication, or the like), and the network entity 502 may calculate the transmit antenna correlation information based at least in part on the one or more signals. In some aspects, a manner in which the network entity 502 calculates the transmit antenna correlation information, or the transmit antenna correlation information itself, is configured on the network entity 502 (e.g., according to a vendor implementation). In some aspects, the transmit antenna correlation information may be used in association with identification of one or more decimation factors, as described below.

At 512, the network entity 502 transmits, to the UE 504, the transmit antenna correlation information. In some aspects, the transmit antenna correlation information may be in a MAC CE.

At 514, the network entity 502 (optionally) transmits, to the UE 504, movement information associated with the network entity 502. The movement information includes one or more parameters that describe a movement characteristic of the network entity 502. For example, the movement information may include information associated with a velocity of the network entity 502. As another example, the movement information may include information associated with a direction of movement of the network entity 502. In some aspects, the movement information is communicated based at least in part on the network entity 502 being a mobile network entity (e.g., if the network entity 502 is a mobile network entity in a non-terrestrial network (NTN)). In some aspects, the movement information can be used by the UE 504 to determine a relative velocity between the UE 504 and the network entity 502. The one or more decimation factors may depend on the relative velocity between the network entity 502 and the UE 504. Therefore, the movement information associated with the network entity 502 may in some aspects be used in order to improve accuracy of decimation factor identification performed by UE 504 as described below. In some aspects, the network entity 502 may be communicated in, for example, a PDCCH communication.

At 516, the UE 504 calculates receive antenna correlation information associated with the UE 504. Receive antenna correlation information includes information associated with correlation between receive antennas of the UE 504. More particularly, the receive antenna correlation information includes one or more parameter values that describes a relationship between signals received at different antennas of the UE 504. In some aspects, the receive antenna correlation information may quantify a degree to which signals received at different antennas of the UE 504 are similar to or dependent upon one another. In some aspects, the UE 504 may identify the one or more decimation factors based at least in part on the receive antenna correlation information, as described below. In some aspects, a manner in which the UE 504 calculates the receive antenna correlation information is configured on the UE 504 (e.g., according to a vendor implementation). In some aspects, the receive antenna correlation information may be used in association with identification of one or more decimation factors, as described below.

At 518, the UE 504 identifies the one or more decimation factors. In some aspects, identifying the one or more decimation factors may include calculating the one or more decimation factors based at least in part on characteristics of a wireless channel between the UE 504 and the network entity 502. Additionally or alternatively, identifying the one or more decimation factors may include performing a lookup based at least in part on characteristics of a wireless channel between the UE 504 and the network entity 502.

A decimation factor indicates a ratio of (1) resources for which an equalizer coefficient is to be calculated in association with performing an equalization operation, to (2) all resources associated with the equalization operation. For example, for an equalization operation associated with a communication received in a set of 100 resources, a decimation factor of 4 indicates that an equalizer coefficient is to be calculated for every fourth resource in the set of 100 resources (e.g., such that 25 equalizer coefficients are calculated). In this example, the decimation factor of 4 serves to reduce UE power consumption by reducing the number of equalizer coefficients that are calculated by the UE 504 (e.g., 25 equalizer coefficients rather than 100 equalizer coefficients). In some aspects, a decimation factor may be with respect to the TD. Thus, in some aspects, the one or more decimation factors may include a TD decimation factor, which indicates a ratio of TD resources. In some aspects, a decimation factor may be with respect to the FD. Thus, in some aspects, the one or more decimation factors may include an FD decimation factor, which indicates a ratio of FD resources. In some aspects, a decimation factor may be defined with respect to both the FD and the TD. Thus, in some aspects, the one or more decimation factors may include an FD/TD decimation factors, which indicates a ratio applied in both the TD and the FD.

In some aspects, the one or more decimation factors may be based on characteristics of a wireless channel between the UE 504 and the network entity 502, such as a channel dispersion (represented by a delay spread), a relative velocity, an SNR, a receive antenna correlation, or a transmit antenna correlation. For example, with respect to the FD, the more dispersive the wireless channel is, the less decimation should be applied. This characteristic is represented by a delay spread of the wireless channel. Thus, the UE 504 may in some aspects identify the one or more decimation factors based at least in part on the delay spread of the wireless channel between the UE 504 and the network entity 502.

As another example, with respect to the TD, the higher relative velocity between the UE 504 and the network entity 502 is, the less decimation should be applied. Thus, the UE 504 may in some aspects identify the one or more decimation factors based at least in part on the relative velocity between the UE 504 and the network entity 502. In some aspects, the UE 504 may calculate the relative velocity based at least in part on movement information associated with the UE 504 (e.g., a velocity of the UE 504, a direction of movement of the UE 504). Additionally or alternatively, the UE 504 may calculate the relative velocity based at least in part on the movement information associated with the network entity 502 (e.g., when the network entity 502 is a mobile network entity).

As another example, a signal-to-noise ratio (SNR) associated with the wireless channel may determine a modulation coding scheme (MCS) used for wireless communication in between the UE 504 and the network entity 502. Here, the addition of errors introduced application of one or more decimation factors worsens an error vector magnitude (EVM) level, which reduces throughput. Therefore, errors introduced by application of the one or more decimation factors should be lower than an EVM threshold in a given scenario. Hence, a higher SNR associated with the wireless channel means that a lower decimation factor (e.g., a smaller decimation ration) should be applied. Thus, the UE 504 may in some aspects identify the one or more decimation factors based at least in part on the SNR associated with the wireless channel between the UE 504 and the network entity 502.

As another example, with respect to transmit antenna correlation, as transmit antenna correlation increases, post-processing inter-layer interference increases, which reduces an EVM. In practice, error introduced by application of the one or more decimation factors should be negligible as compared to the EVM (e.g., to avoid degradation). Therefore, decimation factor values should vary as transmit antenna correlation. Thus, in some aspects, the UE 504 may identify the one or more decimation factors based at least in part on the transmit antenna correlation associated with the network entity 502. Additionally or alternatively, the UE 504 may in some aspects identify the one or more decimation factors based at least in part on the receive antenna correlation associated with the UE 504. Of note, if the UE 504 is not provided with the transmit antenna correlation information, the UE 504 could blindly apply decimation in association perform equalization. However, such an approach could result in throughput degradation (e.g., high transmit antenna correlation leads to a poorly invertible wireless channel which, under decimation, leads to reduced throughput). Of further note, the transmit antenna correlation need not be high in order to apply the techniques and apparatuses depicted and described herein (i.e., the techniques and apparatuses can be applied in a scenario with low transmit antenna correlation, medium transmit antenna correlation, or high transmit antenna correlation).

In some aspects, the UE 504 may identify the one or more decimation factors using one or more data structures, such as one or more decimation factor lookup tables (LUTs) configured on the UE 504. For example, the UE 504 may be configured with a first TD decimation factor LUT that identifies a TD decimation factor to be applied for a given SNR and a given (range of) relative velocity in a low transmit antenna correlation scenario (e.g., when the transmit antenna correlation fails to satisfy a correlation threshold) and a second TD decimation factor LUT that identifies a TD decimation factor to be applied for a given SNR and a given (range of) relative velocity in a high transmit antenna correlation scenario (e.g., when the transmit antenna correlation satisfies the correlation threshold). Similarly, the UE 504 may be configured with a first FD decimation factor LUT that identifies an FD decimation factor to be applied for a given SNR and a given (range of) delay spread in a low transmit antenna correlation scenario and a second FD decimation factor LUT that identifies an FD decimation factor to be applied for a given SNR and a given (range of) delay spread in a high transmit antenna correlation scenario (e.g., when the transmit antenna correlation satisfies the correlation threshold).

In some aspects, the UE 504 may generate one or more LUTs according to a UE calibration process. For example, the UE 504 may calculate values to populate one or more LUTs (e.g., based at least in part on delay spread, relative velocity, SNR, transmit antenna correlation, and/or receive antenna correlation) during a factory calibration process, and may store the one or more LUTs for late use. Additionally or alternatively, the UE 504 may receive one or more LUTs from another wireless communication device (e.g., from another UE 504, from the network entity 502, or the like). In such a case, the one or more LUTs may be based on the UE calibration process. For example, a test device may generate the one or more LUTs.

At 520, the UE 504 performs an equalization operation based at least in part on the one or more decimation factors. In some aspects, as described above, the one or more decimation factors may be associated with (e.g., determined using) the transmit antenna correlation information. Additionally or alternatively, the one or more decimation factors may be associated with (e.g., determined using) one or more characteristics, such as delay spread associated with the wireless channel between the UE 504 and the network entity 502, the relative velocity between the UE 504 and the network entity 502, the SNR associated with the wireless channel, or the receive antenna correlation information associated with the UE 504, as described above.

In some aspects, to perform the equalization operation, the UE 504 may perform an MMSE estimation using a set of equalizer coefficients. In some aspects, the set of equalizer coefficients may be derived from a set of resources according to the one or more decimation factors. As an illustrative example, the UE 504 may be scheduled to receive a communication from the network entity 502 in a set of 100 resources. In one example, the UE 504 identifies a FD/TD decimation factor of 4. Therefore, the UE 504 determines that equalizer coefficients are to be calculated for every fourth resource of the 100 resources (i.e., 25 resources of the 100 resources). The UE 504 selects or identifies the 25 resources for which equalizer coefficients are to be calculated based on the FD/TD decimation factor, and calculates the set of equalizer coefficients accordingly. In some aspects, with respect to the resources for which the UE 504 does not calculate equalizer coefficients (i.e., the resources that were "decimated"), the UE 504 may determine equalizer coefficients using an interpolation technique, such as a linear interpolation technique. In some aspects, the interpolation technique may use equalizer coefficients calculated for adjacent or nearby (e.g., in the TD or the FD) resources in association with determining one or more other equalizer coefficients. For example, in the context of the example provided above, the UE 504 may determine equalizer coefficients for 75 resources (e.g., the resources for which equalizer coefficients are not calculated) using a linear interpolation technique and based at least in part on the equalizer coefficients calculated for the other 25 resources. Of note, the use of an interpolation technique to determine an equalizer coefficient in this manner reduces UE power consumption and computation complexity (e.g., as compared to calculation of the equalizer coefficient in the conventional manner). The UE 504 may then perform the MMSE estimation using the equalizer coefficients calculated by the UE 504 based at least in part on the decimation factor, and the equalizer coefficients determined by the UE 504 according to the interpolation technique. Of note, performing the MMSE estimation in this manner does not result in significant loss and, furthermore, reduces calculation complexity, meaning that system performance is not significantly degraded as a result of application of the one or more decimation factors.

At 522, the UE 504 communicates with the network entity 502 in accordance with the equalization operation. For example, the UE 504 may receive, from the network entity 502, a communication based on the MMSE estimation that uses the set of equalizer coefficients determined in the manner described above.

Note that the process flow illustrated in FIG. 5 is an example associated with a decimation factor that is based on transmit antenna correlation, and aspects of the present disclosure may be applied to a decimation factor that is based on transmit antenna correlation. Note that the process flow illustrated in FIG. 5 is described herein to facilitate an understanding of a decimation factor that is based on transmit antenna correlation, and aspects of the present disclosure may be performed in various manners via alternative or additional signaling and/or operations. In certain aspects, the operations and/or signaling of FIG. 5 may occur in an order different from that described or depicted, and various actions, operations, and/or signaling may be added, omitted, or combined.

Example Operations of a User Equipment

Figure 6:
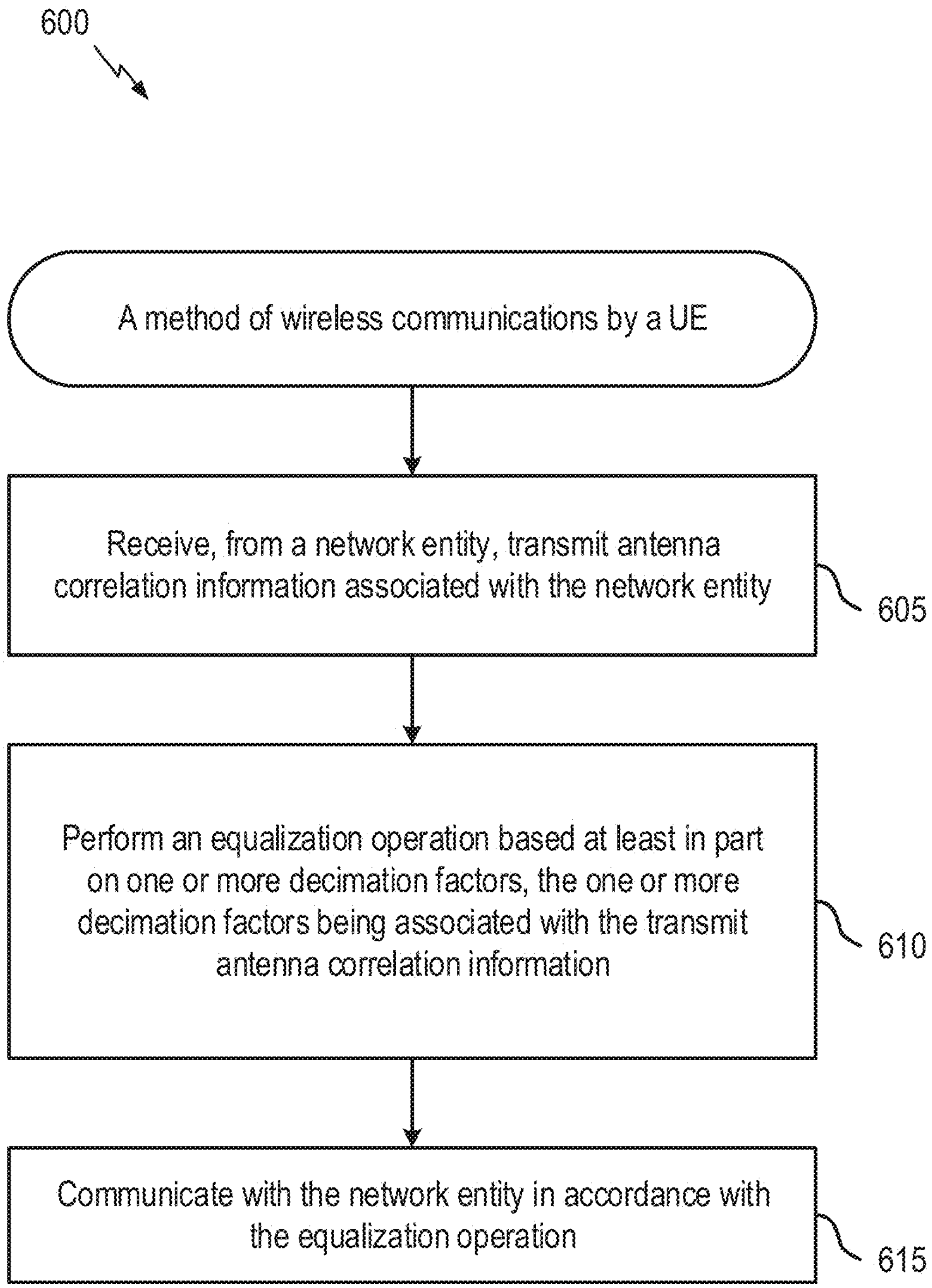
FIG. 6 depicts a method for wireless communications.

FIG. 6 shows a method 600 for wireless communications by a UE, such as UE 104 of FIG. 1 or UE 304 of FIG. 3.

Method 600 begins at block 605 with receiving, from a network entity, transmit antenna correlation information associated with the network entity. For example, a UE 504 may receive, from a network entity 502, transmit antenna correlation information associated with the network entity 502, as depicted and described above with respect to reference 506 of FIG. 5.

Method 600 then proceeds to block 610 with performing an equalization operation based at least in part on one or more decimation factors, the one or more decimation factors being associated with the transmit antenna correlation information. For example, the UE 504 may perform an equalization operation based at least in part on one or more decimation factors, where the one or more decimation factors are associated with the transmit antenna correlation information, as depicted and described above with respect to reference 520 of FIG. 5.

Method 600 then proceeds to block 615 with communicating with the network entity in accordance with the equalization operation. For example, the UE 504 may communicate with the network entity 502 in accordance with the equalization operation, as depicted and described above with respect to reference 522 of FIG. 5.

The method 600 associated with the use of decimation factors that are based on transmit antenna correlation information enables improved wireless communications performance, such as reduced UE power consumption and/or reduced complexity at the UE with respect to performing equalization. The reduced UE power consumption and/or the reduced complexity may be attributable to the method 600, for example, due to reducing the number of equalizer coefficients that need to be calculated by the UE in association with performing equalization.

In some aspects, method 600 further includes transmitting capability information indicating that the UE has a decimation factor capability.

In some aspects, the capability information is in a medium access control (MAC) control element (MAC CE).

In some aspects, method 600 further includes receiving a request to provide the capability information, wherein transmitting the capability information comprises transmitting the capability information in response to the request. For example, the UE 504 may receive a request to provide the capability information, as depicted and described above with respect to reference 506 of FIG. 5.

In some aspects, the request is in a medium access control control element.

In some aspects, the transmit antenna correlation information is in a medium access control control element.

In some aspects, method 600 further includes receiving movement information associated with the network entity, wherein block 610 includes performing the equalization operation based at least in part on a relative velocity between the UE and the network entity, the relative velocity being based at least in part on the movement information. For example, the UE 504 may receive movement information associated with the network entity 502, as depicted and described above with respect to reference 514 of FIG. 5.

In some aspects, the movement information comprises information indicating at least one of a velocity of the network entity or a direction of movement of the network entity.

In some aspects, the movement information is in a physical downlink control channel transmission.

In some aspects, method 600 further includes calculating receive antenna correlation information associated with the UE, wherein identifying the one or more decimation factors comprises identifying the one or more decimation factors based at least in part on the receive antenna correlation information. For example, the UE 504 may calculate receive antenna correlation information associated with the UE 504, as depicted and described above with respect to reference 516 of FIG. 5.

In some aspects, method 600 further includes identifying, based at least in part on the transmit antenna correlation information, the one or more decimation factors for the equalization operation at the UE. For example, the UE 504 may identify, based at least in part on the transmit antenna correlation information, the one or more decimation factors for the equalization operation at the UE 504, as depicted and described above with respect to reference 518 of FIG. 5.

In some aspects, identifying the one or more decimation factors comprises identifying the one or more decimation factors using one or more decimation factor LUTs configured on the UE.

In some aspects, method 600 further includes generating the one or more LUTs according to a UE calibration process.

In some aspects, the one or more decimation factors include at least one of a frequency domain decimation factor or a time domain decimation factor.

In some aspects, block 610 includes performing a minimum mean squared error estimation using a set of equalizer coefficients, the set of equalizer coefficients derived from a set of resources according to the one or more decimation factors.

In some aspects, block 615 includes receiving a communication based on the minimum mean squared error estimation that uses the set of equalizer coefficients.

Figure 7:
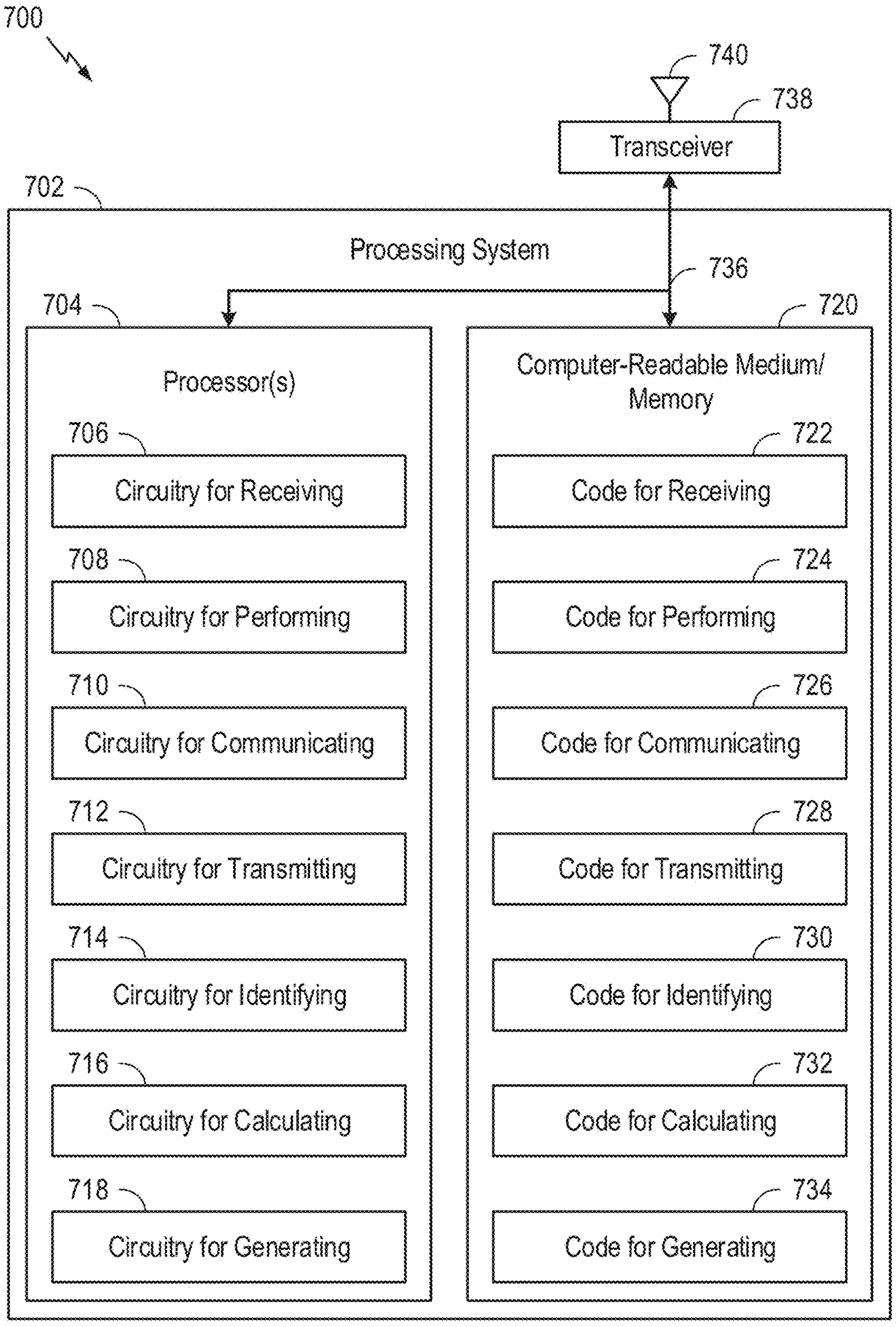
FIG. 7 depicts aspects of an example communications device.

In some aspects, method 600, or any aspect related to it, may be performed by an apparatus, such as communications device 700 of FIG. 7, which includes various components operable, configured, or adapted to perform the method 600. Communications device 700 is described below in further detail.

Note that FIG. 6 is just one example of a method, and other methods including fewer, additional, or alternative operations are possible consistent with this disclosure.

Example Communications Device

FIG. 7 depicts aspects of an example communications device 700 configured for wireless communications. In some aspects, communications device 700 is a user equipment, such as UE 104 described above with respect to FIG. 1 or UE 304 described with respect to FIG. 3.

The communications device 700 includes a processing system 702 coupled to a transceiver 738 (e.g., a transmitter and/or a receiver). The transceiver 738 is configured to transmit and receive signals for the communications device 700 via an antenna 740, such as the various signals as described herein. The processing system 702 may be configured to perform processing functions for the communications device 700, including processing signals received and/or to be transmitted by the communications device 700.

The processing system 702 includes one or more processors 704 and a computer-readable medium/memory 720. In various aspects, the one or more processors 704 may be representative of the one or more processors 318 described with respect to FIG. 3. The one or more processors 704 are coupled to a computer-readable medium/memory 720 via a bus 736. In some aspects, the computer-readable medium/memory 720 may be representative of the one or more memories 320 described with respect to FIG. 3. The computer-readable medium/memory 720 is a non-transitory computer-readable medium/memory. In certain aspects, the computer-readable medium/memory 720 is configured to store instructions (e.g., computer-executable code), that when executed by the one or more processors 704, cause the one or more processors 704 to perform the method 600 described with respect to FIG. 6, or any aspect related to it, including any operations described in relation to FIG. 6. Note that reference to a processor performing a function of communications device 700 may include one or more processors performing that function of communications device 700, such as in a distributed fashion.

In the depicted example, computer-readable medium/memory 720 stores code (e.g., executable instructions), including code for receiving 722, code for performing 724, code for communicating 726, code for transmitting 728, code for identifying 730, code for calculating 732, and code for generating 734. Processing of the code 722-734 may enable and cause the communications device 700 to perform the method 600 described with respect to FIG. 6, or any aspect related to it. For instance, in some aspects, code for receiving 722 includes code for receiving, from a network entity, transmit antenna correlation information associated with the network entity (e.g., as depicted and described with respect to block 605 of FIG. 6). In some aspects, code for performing 724 includes code for performing an equalization operation based at least in part on one or more decimation factors, the one or more decimation factors being associated with the transmit antenna correlation information (e.g., as depicted and described with respect to block 610 of FIG. 6). In some aspects, code for communicating 726 includes code for communicating with the network entity in accordance with the equalization operation (e.g., as depicted and described with respect to block 615 of FIG. 6).

The one or more processors 704 include circuitry configured to implement (e.g., execute) the code stored in the computer-readable medium/memory 720, including circuitry for receiving 706, circuitry for performing 708, circuitry for communicating 710, circuitry for transmitting 712, circuitry for identifying 714, circuitry for calculating 716, and circuitry for generating 718. Processing with circuitry 706-718 may enable and cause the communications device 700 to perform the method 600 described with respect to FIG. 6, or any aspect related to it. For instance, in some aspects, circuitry for receiving 706 includes circuitry for receiving, from a network entity, transmit antenna correlation information associated with the network entity (e.g., as depicted and described with respect to block 605 of FIG. 6). In some aspects, circuitry for performing 708 includes circuitry for performing an equalization operation based at least in part on one or more decimation factors, the one or more decimation factors being associated with the transmit antenna correlation information (e.g., as depicted and described with respect to block 610 of FIG. 6). In some aspects, cod circuitry for communicating 710 includes circuitry for communicating with the network entity in accordance with the equalization operation (e.g., as depicted and described with respect to block 615 of FIG. 6).

More generally, means for communicating, transmitting, sending or outputting for transmission may include the one or more transceivers 324, one or more antenna 322 and/or processing system 316 of the UE 304 illustrated in FIG. 3, transceiver 738 and/or antenna 740 of the communications device 700 in FIG. 7, and/or one or more processors 704 of the communications device 700 in FIG. 7. Means for communicating, receiving or obtaining may include the one or more transceivers 324, one or more antennas 322, and/or processing system 316 of the UE 304 illustrated in FIG. 3, transceiver 738 and/or antenna 740 of the communications device 700 in FIG. 7, and/or one or more processors 704 of the communications device 700 in FIG. 7.

Example Operations of a Network Entity

Figure 8:
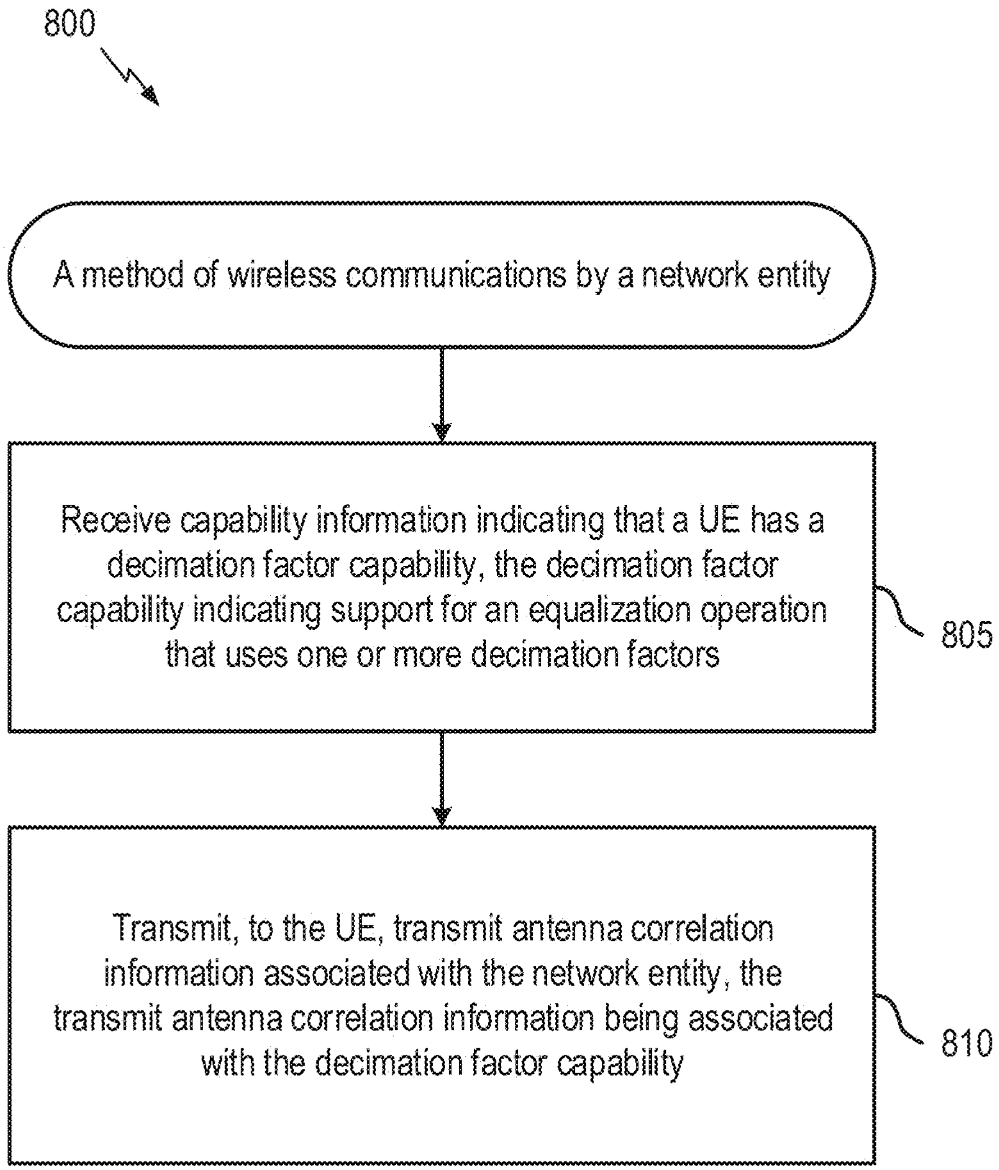
FIG. 8 depicts another method for wireless communications.

FIG. 8 shows a method 800 for wireless communications by a network entity, such as BS 102 of FIG. 1, a first network entity 300 or second network entity 302 of FIG. 3, or a disaggregated base station as discussed with respect to FIG. 2.

Method 800 begins at block 805 with receiving capability information indicating that a UE has a decimation factor capability, the decimation factor capability indicating support for an equalization operation that uses one or more decimation factors. For example, the network entity 502 may receive capability information indicating that a UE 504 has a decimation factor capability, as depicted and described with respect to reference 508 of FIG. 5.

Method 800 then proceeds to block 810 with transmitting, to the UE, transmit antenna correlation information associated with the network entity, the transmit antenna correlation information being associated with the decimation factor capability. For example, the network entity 502 may transmit, to the UE 504, transmit antenna correlation information associated with the network entity 502, as depicted and described above with respect to reference 512 of FIG. 5.

In certain aspects, method 800 further includes communicating with the UE in accordance with an equalization operation that is based at least in part on one or more decimation factors associated with the transmit antenna correlation information. For example, the network entity 502 may communicate with the UE 504 in accordance with an equalization operation that is based at least in part on one or more decimation factors associated with the transmit antenna correlation information, as depicted and described above with respect to reference 522 of FIG. 5.

The method 700 associated with the use of decimation factors that are based on transmit antenna correlation information enables improved wireless communications performance, such as reduced UE power consumption and/or reduced complexity with respect to performing equalization. The reduced UE power consumption and/or the reduced complexity may be attributable to the method 700, for example, due to the communication of the transmit antenna correlation information associated with the network entity 502 in association with identification of one or more decimation factors to be used in association with an equalization operation.

In some aspects, the capability information is in a medium access control control element.

In certain aspects, method 800 further includes receiving at least one of a SRS or a PUSCH, wherein calculating the transmit antenna correlation information comprises calculating the transmit antenna correlation information based at least in part on the SRS or the PDSCH.

In certain aspects, method 800 further includes transmitting a request to provide the capability information, wherein block 805 includes receiving the capability information in response to the request. For example, the network entity 502 may transmit, a request to provide the capability information, as depicted and described above with respect to reference 506 of FIG. 5.

In some aspects, the request is in a medium access control control element.

In certain aspects, method 800 further includes calculating the transmit antenna correlation information associated with the network entity. For example, the network entity 502 may calculate the transmit antenna correlation information associated with the network entity 502, as depicted and described above with respect to reference 510 of FIG. 5.

In some aspects, the transmit antenna correlation information is in a medium access control control element.

In certain aspects, method 800 further includes transmitting movement information associated with the network entity. For example, the network entity 502 may transmit movement information, as depicted and described above with respect to reference 514 of FIG. 5.

In some aspects, the movement information comprises information associated with at least one of a velocity of the network entity or a direction of movement of the network entity.

In some aspects, the movement information is in a physical downlink control channel.

In some aspects, the one or more decimation factors include at least one of a frequency domain decimation factor or a time domain decimation factor.

Figure 9:
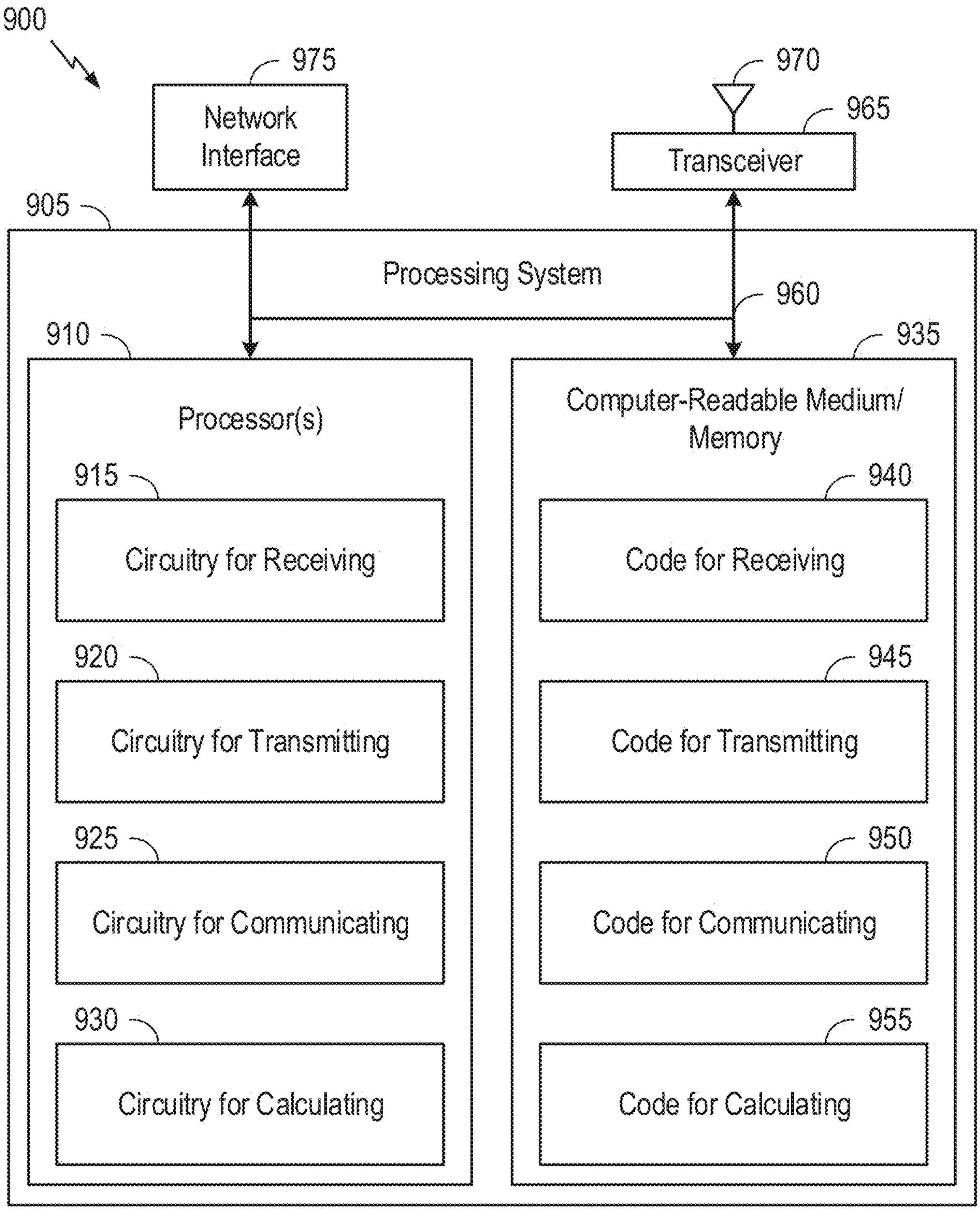
FIG. 9 depicts aspects of an example communications device.

In some aspects, method 800, or any aspect related to it, may be performed by an apparatus, such as communications device 900 of FIG. 9, which includes various components operable, configured, or adapted to perform the method 800. Communications device 900 is described below in further detail.

Note that FIG. 8 is just one example of a method, and other methods including fewer, additional, or alternative operations are possible consistent with this disclosure.

Example Communications Device

FIG. 9 depicts aspects of an example communications device configured for wireless communications. In some aspects, communications device 900 is a network entity, such as BS 102 of FIG. 1, first network entity 300 or second network entity 302 of FIG. 3, or a disaggregated base station as discussed with respect to FIG. 2.

The communications device 900 includes a processing system 905 coupled to a transceiver 965 (e.g., a transmitter and/or a receiver) and/or a network interface 975. The transceiver 965 is configured to transmit and receive signals for the communications device 900 via an antenna 970, such as the various signals as described herein. The network interface 975 is configured to obtain and send signals for the communications device 900 via communications link(s), such as a backhaul link, midhaul link, and/or fronthaul link as described herein, such as with respect to FIG. 2. The processing system 905 may be configured to perform processing functions for the communications device 900, including processing signals received and/or to be transmitted by the communications device 900.

The processing system 905 includes one or more processors 910 and a computer-readable medium/memory 935. In various aspects, one or more processors 910 may be representative of the one or more processors 308, as described with respect to FIG. 3. The one or more processors 910 are coupled to the computer-readable medium/memory 935 via a bus 960. In certain aspects, the computer-readable medium/memory 935 is configured to store instructions (e.g., computer-executable code), including code 940-955, that when executed by the one or more processors 910, cause the one or more processors 910 to perform the method 800 described with respect to FIG. 8, or any aspect related to it, including any operations described in relation to FIG. 8. The computer-readable medium/memory 935 is a non-transitory computer-readable medium/memory. Note that reference to a processor of communications device 900 performing a function may include one or more processors of communications device 900 performing that function, such as in a distributed fashion.

In the depicted example, the computer-readable medium/memory 935 stores code (e.g., executable instructions), including code for receiving 940, code for transmitting 945, code for communicating 950, and code for calculating 955. Processing of the code 940-955 may enable and cause the communications device 900 to perform the method 800 described with respect to FIG. 8, or any aspect related to it. For instance, in some aspects, code for receiving 940 includes code for receiving capability information indicating that a UE has a decimation factor capability, the decimation factor capability indicating support for an equalization operation that uses one or more decimation factors (e.g., as depicted and described with respect to block 805 of FIG. 8). In some aspects, code for transmitting 945 includes code for transmitting, to the UE, transmit antenna correlation information associated with the network entity, the transmit antenna correlation information being associated with the decimation factor capability (e.g., as depicted and described with respect to block 810 of FIG. 8).

The one or more processors 910 include circuitry configured to implement (e.g., execute) the code stored in the computer-readable medium/memory 935, including circuitry for receiving 915, circuitry for transmitting 920, circuitry for communicating 925, and circuitry for calculating 930. Processing with circuitry 915-930 may enable and cause the communications device 900 to perform the method 800 described with respect to FIG. 8, or any aspect related to it. For instance, in some aspects, circuitry for receiving 915 includes circuitry for receiving capability information indicating that a UE has a decimation factor capability, the decimation factor capability indicating support for an equalization operation that uses one or more decimation factors (e.g., as depicted and described with respect to block 805 of FIG. 8). In some aspects, circuitry for transmitting 920 includes circuitry for transmitting, to the UE, transmit antenna correlation information associated with the network entity, the transmit antenna correlation information being associated with the decimation factor capability (e.g., as depicted and described with respect to block 810 of FIG. 8).

Various components of the communications device 900 may provide means for performing the method 800 described with respect to FIG. 8, or any aspect related to it. Means for communicating, transmitting, sending or outputting for transmission may include the one or more transceivers 312, one or more antennas 314, and/or processing system 306 of the first network entity 300 or the second network entity 302 illustrated in FIG. 3, transceiver 965, antenna 970, and/or network interface 975 of the communications device 900 in FIG. 9, and/or one or more processors 910 of the communications device 900 in FIG. 9. Means for communicating, receiving or obtaining may include the one or more transceivers 312, one or more antennas 314, and/or processing system 306 of the first network entity 300 or the second network entity 302 illustrated in FIG. 3, transceiver 965, antenna 970, and/or network interface 975 of the communications device 900 in FIG. 9, and/or one or more processors 910 of the communications device 900 in FIG. 9.

EXAMPLE CLAUSES

Implementation examples are described in the following numbered clauses:

Clause 1: A method of wireless communications by a UE, comprising: receiving, from a network entity, transmit antenna correlation information associated with the network entity; performing an equalization operation based at least in part on one or more decimation factors, the one or more decimation factors being associated with the transmit antenna correlation information; and communicating with the network entity in accordance with the equalization operation.

Clause 2: The method of Clause 1, further comprising transmitting capability information indicating that the UE has a decimation factor capability.

Clause 3: The method of Clause 2, wherein the capability information is in a medium access control control element.

Clause 4: The method of Clause 2, further comprising receiving a request to provide the capability information, wherein transmitting the capability information comprises transmitting the capability information in response to the request.

Clause 5: The method of Clause 4, wherein the request is in a medium access control control element.

Clause 6: The method of any one of Clauses 1-5, wherein the transmit antenna correlation information is in a medium access control control element.

Clause 7: The method of any one of Clauses 1-6, further comprising: receiving movement information associated with the network entity, wherein performing the equalization operation comprises performing the equalization operation based at least in part on a relative velocity between the UE and the network entity, the relative velocity being based at least in part on the movement information.

Clause 8: The method of Clause 7, wherein the movement information comprises information indicating at least one of a velocity of the network entity or a direction of movement of the network entity.

Clause 9: The method of Clause 7, wherein the movement information is in a physical downlink control channel transmission.

Clause 10: The method of any one of Clauses 1-9, further comprising calculating receive antenna correlation information associated with the UE, wherein identifying the one or more decimation factors comprises identifying the one or more decimation factors based at least in part on the receive antenna correlation information.

Clause 11: The method of any one of Clauses 1-10, further comprising identifying, based at least in part on the transmit antenna correlation information, the one or more decimation factors for the equalization operation at the UE.

Clause 12: The method of Clause 11, wherein identifying the one or more decimation factors comprises identifying the one or more decimation factors using one or more decimation factor LUTs configured on the UE.

Clause 13: The method of Clause 12, further comprising generating the one or more LUTs according to a UE calibration process.

Clause 14: The method of any one of Clauses 1-13, wherein the one or more decimation factors include at least one of a frequency domain decimation factor or a time domain decimation factor.

Clause 15: The method of any one of Clauses 1-14, wherein performing the equalization operation based at least in part on one or more decimation factors comprises performing a minimum mean squared error estimation using a set of equalizer coefficients, the set of equalizer coefficients derived from a set of resources according to the one or more decimation factors.

Clause 16: The method of Clause 15, wherein communicating with the network entity in accordance with the equalization operation comprises receiving a communication based on the minimum mean squared error estimation that uses the set of equalizer coefficients.

Clause 17: A method of wireless communications by a network entity, comprising: receiving capability information indicating that a UE has a decimation factor capability, the decimation factor capability indicating support for an equalization operation that uses one or more decimation factors; and transmitting, to the UE, transmit antenna correlation information associated with the network entity, the transmit antenna correlation information being associated with the decimation factor capability.

Clause 18: The method of Clause 17, further comprising communicating with the UE in accordance with an equalization operation that is based at least in part on one or more decimation factors associated with the transmit antenna correlation information.

Clause 19: The method of any one of Clauses 17-18, wherein the capability information is in a medium access control control element.

Clause 20: The method of any one of Clauses 17-19, further comprising transmitting a request to provide the capability information, wherein receiving the capability information comprises receiving the capability information in response to the request.

Clause 21: The method of Clause 20, wherein the request is in a medium access control control element.

Clause 22: The method of any one of Clauses 17-21, further comprising calculating the transmit antenna correlation information associated with the network entity.

Clause 23: The method of Clause 19, further comprising receiving at least one of a SRS or a PUSCH, wherein calculating the transmit antenna correlation information comprises calculating the transmit antenna correlation information based at least in part on the SRS or the PDSCH.

Clause 24: The method of any one of Clauses 17-23, wherein the transmit antenna correlation information is in a medium access control control element.

Clause 25: The method of any one of Clauses 17-24, further comprising transmitting movement information associated with the network entity.

Clause 26: The method of Clause 25, wherein the movement information comprises information associated with at least one of a velocity of the network entity or a direction of movement of the network entity.

Clause 27: The method of Clause 25, wherein the movement information is in a physical downlink control channel.

Clause 28: The method of any one of Clauses 17-27, wherein the one or more decimation factors include at least one of a frequency domain decimation factor or a time domain decimation factor.

Clause 29: One or more apparatuses, comprising: one or more memories comprising executable instructions; and one or more processors configured to execute the executable instructions and cause the one or more apparatuses to perform a method in accordance with any one of Clauses 1-28.

Clause 30: One or more apparatuses configured for wireless communications, comprising: one or more memories; and one or more processors, coupled to the one or more memories, configured to cause the one or more apparatuses to perform a method in accordance with any one of Clauses 1-28.

Clause 31: One or more apparatuses configured for wireless communications, comprising: one or more memories; and one or more processors, coupled to the one or more memories, configured to perform a method in accordance with any one of Clauses 1-28.

Clause 32: One or more apparatuses, comprising means for performing a method in accordance with any one of Clauses 1-28.

Clause 33: One or more non-transitory computer-readable media comprising executable instructions that, when executed by one or more processors of one or more apparatuses, cause the one or more apparatuses to perform a method in accordance with any one of Clauses 1-28.

Clause 34: One or more computer program products embodied on one or more computer-readable storage media comprising code for performing a method in accordance with any one of Clauses 1-28.

Clause 35: One or more apparatuses configured for wireless communications, comprising: a processing system that includes one or more processors and one or more memories coupled with the one or more processors, the processing system configured to cause the one or more apparatuses to perform a method in accordance with any one of Clauses 1-28.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, an AI processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a SoC, a SiP, or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "the processor," etc.), unless otherwise specifically stated, should be understood to refer to one or more elements (e.g., "one or more processors," or the like). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus for wireless communications, comprising a processing system that includes one or more processors and one or more memories coupled with the one or more processors, the processing system configured to cause a user equipment (UE) to:

receive, from a network entity, transmit antenna correlation information associated with the network entity;

perform an equalization operation based at least in part on one or more decimation factors, the one or more decimation factors being associated with the transmit antenna correlation information; and communicate with the network entity in accordance with the equalization operation.

2. The apparatus of claim 1, wherein the processing system is configured to cause the UE to transmit capability information indicating that the UE has a decimation factor capability.

3. The apparatus of claim 2, wherein the capability information is in a medium access control (MAC) control element (MAC CE).

4. The apparatus of claim 2, wherein the processing system is configured to cause the UE to receive a request to provide the capability information, wherein to cause the UE to transmit the capability information, the processing system is configured to cause the UE to transmit the capability information in response to the request.

5. The apparatus of claim 4, wherein the request is in a medium access control (MAC) control element (MAC CE).

6. The apparatus of claim 1, wherein the transmit antenna correlation information is in a medium access control (MAC) control element (MAC CE).

7. The apparatus of claim 1, wherein the processing system is configured to cause the UE to:

receive movement information associated with the network entity, wherein to cause the UE to perform the equalization operation, the processing system is configured to cause the UE to perform the equalization operation based at least in part on a relative velocity between the UE and the network entity, the relative velocity being based at least in part on the movement information.

8. The apparatus of claim 7, wherein the movement information comprises information indicating at least one of a velocity of the network entity or a direction of movement of the network entity.

9. The apparatus of claim 7, wherein the movement information is in a physical downlink control channel transmission.

10. The apparatus of claim 1, wherein the processing system is configured to cause the UE to calculate receive antenna correlation information associated with the UE, wherein to cause the UE to identify the one or more decimation factors, the processing system is configured to cause the UE to identify the one or more decimation factors based at least in part on the receive antenna correlation information.

11. The apparatus of claim 1, wherein the processing system is configured to cause the UE to identify, based at least in part on the transmit antenna correlation information, the one or more decimation factors for the equalization operation at the UE.

12. The apparatus of claim 11, wherein to cause the UE to identify the one or more decimation factors, the processing system is configured to cause the UE to identify the one or more decimation factors using one or more decimation factor lookup tables (LUTs) configured on the UE.

13. The apparatus of claim 12, wherein the processing system is configured to cause the UE to generate the one or more decimation factor LUTs according to a UE calibration process.

14. The apparatus of claim 1, wherein the one or more decimation factors include at least one of a frequency domain decimation factor or a time domain decimation factor.

15. The apparatus of claim 1, wherein to cause the UE to perform the equalization operation based at least in part on the one or more decimation factors, the processing system is configured to cause the UE to perform a minimum mean squared error estimation using a set of equalizer coefficients, the set of equalizer coefficients derived from a set of resources according to the one or more decimation factors.

16. The apparatus of claim 15, wherein to cause the UE to communicate with the network entity in accordance with the equalization operation, the processing system is configured to cause the UE to receive a communication based on the minimum mean squared error estimation that uses the set of equalizer coefficients.

17. An apparatus for wireless communications, comprising a processing system that includes one or more processors and one or more memories coupled with the one or more processors, the processing system configured to cause a network entity to:

receive capability information indicating that a user equipment (UE) has a decimation factor capability, the decimation factor capability indicating support for an equalization operation that uses one or more decimation factors; and transmit, to the UE, transmit antenna correlation information associated with the network entity, the transmit antenna correlation information being associated with the decimation factor capability.

18. The apparatus of claim 17, wherein the processing system is configured to cause the network entity to communicate with the UE in accordance with the equalization operation that is based at least in part on the one or more decimation factors associated with the transmit antenna correlation information.

19. The apparatus of claim 17, wherein the capability information is in a medium access control (MAC) control element (MAC CE).

20. The apparatus of claim 17, wherein the processing system is configured to cause the network entity to transmit a request to provide the capability information, wherein to cause the network entity to receive the capability information, the processing system is configured to cause the network entity to receive the capability information in response to the request.

21. The apparatus of claim 20, wherein the request is in a medium access control (MAC) control element (MAC CE).

22. The apparatus of claim 17, wherein the processing system is configured to cause the network entity to calculate the transmit antenna correlation information associated with the network entity.

23. The apparatus of claim 22, wherein the processing system is configured to cause the network entity to receive at least one of a sounding reference signal (SRS) or a physical uplink shared channel (PUSCH), wherein to cause the network entity to calculate the transmit antenna correlation information, the processing system is configured to cause the network entity to calculate the transmit antenna correlation information based at least in part on the SRS or the PUSCH.

24. The apparatus of claim 17, wherein the transmit antenna correlation information is in a medium access control (MAC) control element (MAC CE).

25. The apparatus of claim 17, wherein the processing system is configured to cause the network entity to transmit movement information associated with the network entity.

26. The apparatus of claim 25, wherein the movement information comprises information associated with at least one of a velocity of the network entity or a direction of movement of the network entity.

27. The apparatus of claim 25, wherein the movement information is in a physical downlink control channel.

28. The apparatus of claim 17, wherein the one or more decimation factors include at least one of a frequency domain decimation factor or a time domain decimation factor.

29. A method of wireless communications by a user equipment (UE), comprising:

receiving, from a network entity, transmit antenna correlation information associated with the network entity;

performing an equalization operation based at least in part on one or more decimation factors, the one or more decimation factors being associated with the transmit antenna correlation information; and communicating with the network entity in accordance with the equalization operation.

30. A method of wireless communications by a network entity, comprising:

receiving capability information indicating that a user equipment (UE) has a decimation factor capability, the decimation factor capability indicating support for an equalization operation that uses one or more decimation factors; and transmitting, to the UE, transmit antenna correlation information associated with the network entity, the transmit antenna correlation information being associated with the decimation factor capability.

* * * * *